United States Patent [19]

Giebel et al.

[11] Patent Number: 4,735,836

[45] Date of Patent: Apr. 5, 1988

[54] SLEEVE FORMED OF SHRINKABLE MATERIAL AND A PROCESS FOR THE PRODUCTION THEREOF

[75] Inventors: Wolfgang Giebel, Planegg; Ernst Bachel, Geltendorf; Klaus Jurczek, Olching, all of Fed. Rep. of Germany

[73] Assignee: Siemens Aktiengesellschaft, Berlin and Munich, Fed. Rep. of Germany

[21] Appl. No.: 817,862

[22] Filed: Jan. 13, 1986

[30] Foreign Application Priority Data

Feb. 8, 1985 [DE] Fed. Rep. of Germany ....... 3504380

[51] Int. Cl.$^4$ ................................................. B32B 1/08
[52] U.S. Cl. ......................................... 428/36; 428/99; 428/119; 428/910; 174/DIG. 8; 138/158; 138/162
[58] Field of Search ................. 428/99, 36, 910, 119; 174/DIG. 8, 92; 138/162, 166, 167, 158

[56] References Cited

U.S. PATENT DOCUMENTS

| 4,379,473 | 4/1983 | Kunze | 174/DIG. 8 |
| 4,490,422 | 12/1984 | Pascher | 174/DIG. 8 |
| 4,518,448 | 5/1985 | Henry et al. | 174/DIG. 8 |

FOREIGN PATENT DOCUMENTS 1506242 4/1978 United Kingdom .

Primary Examiner—Alexander S. Thomas
Attorney, Agent, or Firm—Hill, Van Santen, Steadman & Simpson

[57] ABSTRACT

A sleeve formed of shrinkable material has a longitudinal closure formed of projections and corresponding cut-outs along two longitudinal edges of the closure. The projections of the two longitudinal edges are offset relative to one another and have at least a partially clearly defined reinforcement in relation to the encasing component. When the projections have been fitted together, a retaining element is applied at least periodically to the reinforcements which have been fitted together in series.

31 Claims, 6 Drawing Sheets

SLEEVE FORMED OF SHRINKABLE MATERIAL AND A PROCESS FOR THE PRODUCTION THEREOF

BACKGROUND OF THE INVENTION

The invention relates to a sleeve formed of a shrinkable material sleeve body having a longitudinal closure with projections and corresponding cut-outs along both opposite longitudinal edges. The projections and cut-outs of the two longitudinal edges are offset relative to one another and can be inserted one into another.

British Pat. No. 1,506,242, incorporated herein by reference, has disclosed a heat-shrinkable sleeve which, along both longitudinal edges, is provided with projections, is undercut in dove-tailed fashion, and has matching cut-outs for longitudinal closure. When the sleeve is assembled, the individual projections are inserted into the opposite cut-outs so that they are hooked one to another. However, this method of hooking has various disadvantages. On the one hand, the sleeve can relatively easily snap open when heated, unless it is ensured that relatively thin longitudinal edges are appropriately fixed, and on the other hand in the case of thin wall thicknesses, which are usual in the case or film-type sleeves, a closure of this kind cannot be achieved since it is scarcely possible to hook the thin closure elements one to another. Therefore, in this cable sleeve, a so-called "underlay" is provided which contributes to the support of the closure elements. This means that a continuous and thus cost-saving production process—such as for example an extrusion—is impossible, or difficult to achieve. Furthermore, the stability of the closure during the shrinkage process is an extreme problem since the shape stability can be ensured during the necessary heating only by means of an extremely high cross-linking. In such a case, the expansion factor is then impermissibly limited for most applications.

SUMMARY OF THE INVENTION

An object of the present invention is to provide a sleeve, the closure elements of which are virtually independent of the wall thickness of the encasing portion of the sleeve, and in which the necessary assembly stability is achieved by simply inserting the corresponding closure elements one into another. The necessary stability of the closure elements is to be assured during the shrinkage process. This object is fulfilled by means of a sleeve of the type described in the introduction wherein the projections have at least periodic longitudinally directed reinforcements, and that at least a periodic retaining element which covers the reinforcements. They are assembled in series at the projections of the two longitudinal edges. A further object of the invention is to provide a process by which a sleeve of this kind can be manufactured.

According to a method of the invention for the production of a sleeve formed of a shrinkable material sleeve body, the sleeve is extruded in the form of a plate having a central portion and lateral reinforcements comprising a cross-linkable synthetic material. The sleeve is then subjected to a cross-linking process where the lateral projections are provided with a stronger cross-linking than the central portion. The central portion is expanded in a transverse direction and then cut-outs are punched out. A retaining element is provided which engages over the reinforcements. The projections are fitted in the cut-outs and the retaining element is fitted over the reinforcements.

An advantage of the invention is that, already during assembly, the sleeve acquires sufficient stability to enable the remaining operating steps to be carried out without the danger of it snapping open, since the closure elements are simply inserted one into another as projections along the two longitudinal edges. The closure elements, which are formed of reinforcements, are then finally secured by covering the region of the closure with a retaining element. This retaining element can be of a relatively simple design and thus can even comprise an extruded synthetic component. A particularly reliable design is when the retaining element is formed of shrinkable material. Also, special adaptations are possible using the shape memory of such elements. If, for example, projecting under-cut beads are selected for the closure elements, these can be held together by a clip-like retaining element, and optimum conditions with respect to adaptation and sealing can be achieved on the basis of the selection of the material. An additional improvement is achieved if the surface of the retaining element which faces towards the closure area of the sleeve is coated with an appropriate sealing means, for example an adhesive. In corresponding exemplary embodiments of the invention, the retaining element can be removed following the shrinkage process, since when the closure elements which have been caused to adhere to one another have sufficient inherent stability, it becomes superfluous. Adhesive strips applied following the assembly of the closure elements, and which may only be required for fixing during the shrinkage process, are suitable, for example, in such exemplary embodiments.

DESCRIPTION OF THE PREFERRED EMBODIMENTS

Figure 1:
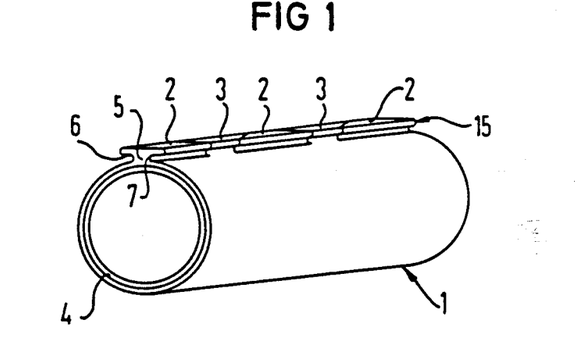
FIG. 1 illustrates a formation of the sleeve in accordance with the invention before the application of the retaining element.

The sleeve in accordance with the invention shown in FIG. 1 illustrates that the closure region is formed of a plurality of bead-like reinforcements 2 and 3 arranged in series. In this case, the reinforcements 2 and 3 are approximately of T-formation so as to form two longitudinal grooves 6 separated from one another by the central rib 5, and into which a clip-like retaining element is subsequently introduced which is placed or pressed into position. The outwardly directed reinforcements 2 and 3 are arranged on the projections 7 along the two longitudinal edges. These projections 7, and thus also the reinforcements 2 and 3 arranged upon them, are undercut in dove-tailed fashion so that, having been assembled, they can be lined up like puzzle pieces. This produces a continuous closed bead 15 and in this way the sleeve 1 is already pre-assembled. Because of the shrinkage process, the projections could become detached and therefore a retaining element is required at least for the duration of the shrinkage. In accordance with the invention, a retaining element of this kind is glued to the closure area, is placed onto it, or is pressed onto it in locking fashion, thus preventing an unintentional opening. In this examplary embodiment, the final fixing is then achieved by applying a clip-like retaining element to this bead 15. The inner surface and the closure area of the sleeve 1 are preferably equipped with an adhesive coating 4 which melts when heat is applied, so that the necessary seal can be achieved, even during the shrinkage process.

Figure 2:
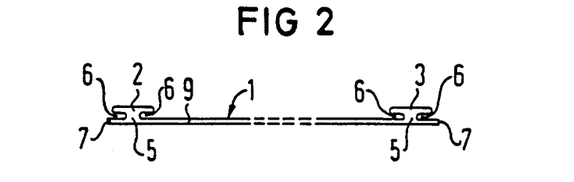
FIG. 2 illustrates an end view of the sleeve in accordance with FIG. 1 as an extrusion.

FIG. 2 shows the surface structure in an end view of the unassembled sleeve 1. The central zone 9 represents the part which serves as a casing and must thus have special adaptation and shrinkage properties. This central zone 9 is therefore provided with a lower cross-linking than the edge zones 9 with the projections 7 and the reinforcements 2 and 3 arranged upon these projections, since the last-mentioned closure areas must remain as stable in shape as possible when heat is supplied. Here the approximately T-shaped formation of the reinforcements 2 and 3 can be seen with their central ribs 5 which separate the two longitudinal grooves from one another. A sleeve of this kind can first be produced in a simple manner by extrusion. Then this extruded molding is cross-linked at the stated zones with varying degrees of cross-linking. This can be carried out either by chemical cross-linking or by radiation cross-linking. In the case of the first process, various extruders are required, one for the material of the central zone 9 having a low peroxide concentration. In the case of radiation cross-linking, however, one extruder is sufficient. Beneath the scanner of the electron acceleration system, the central zone 9, which is to have a low level of cross-linking, is then appropriately covered so that only those zones which are to have the higher level of cross-linking are fully exposed to the radiation. Naturally it is also possible to combine both processes. This is advantageous if materials which can be periodically cross-linked do not exhibit an adequate expansion rate. Accordingly, the first extruder processes a material without or with only a small addition of cross-linking accelerators, and the second extruders for the reinforcement zones processes a material having a high proportion of cross-linking accelerators. In the electron acceleration system, a high level of cross-linking is then achieved in the reinforcement zones, and a low level of cross-linking is achieved in the central zone of the sleeve.

As a result of the cross-linking, it is possible to impress a shrinkage memory upon a molding of this kind.

In other words, if the cross-linked molding is expanded, when re-heated it will return to the initial shape existent in the cross-linking. It depends upon the production process as to when the cut-outs are introduced, either into the extruded component or the expanded component. If the advantageous system of multiple extrusion is taken into account, it is advisable to punch the outer contours following the expansion.

With multiple extrusion, the projections 7 can additionally be considered to represent extrusion attachments or longitudinal edges. Otherwise, in practice they would be entirely re-formed. The recess 6 on the inside is adequate for most applications. The outwardly directed attachments of the projections 7 can now be dispensed with, i.e. the projection 7 terminates at the outer attachment of the reinforcement 2, 3.

Figure 3:
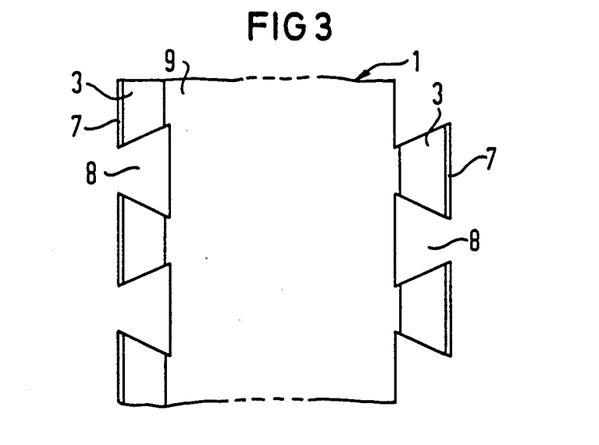
FIG. 3 illustrates the formation of the closure elements in accordance with the invention in a plan view of the sleeve.

FIG. 3 shows in plan view the final form of the sleeve 1, which can be used, for example as a cable sleeve. The closure element can already be seen in the form of projections 7 which are formed along the two longitudinal edges by corresponding cut-outs 8, which in this example are dove-tails. The only difference between the longitudinal edges is that the cut-outs 8, and thus the corresponding projections 7, are offset relative to one another. The cut-outs 8 and projections 7 correspond to one another in shape so that the projections 7 of the one longitudinal edge can be inserted in shape-locking fashion into the cut-outs 8 of the second longitudinal edge. It can also be seen that the reinforcements 2 and 3 which here are directed upwardly, have the same cut-out profile as the projection 7, so that when these are assembled, the above-described continuous bead 15 can be formed. Naturally, similar shapes which differ from the exact trapezoidal shape of the cut-outs 8 are also possible, although the fundamental mutual engagement is critical.

Figure 4:
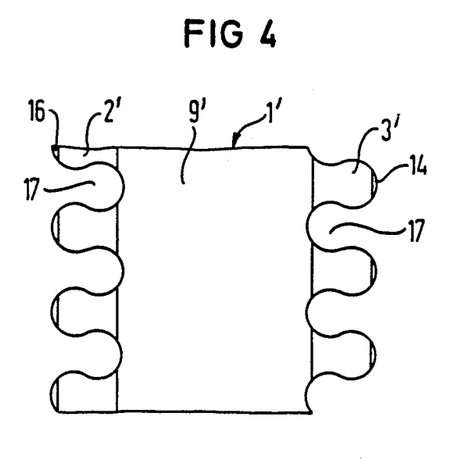
FIG. 4 illustrates a further exemplary embodiment of closure elements along the longitudinal edges.

FIG. 4 likewise illustrates a sleeve 1' with a central zone 9' and with offset projections 16 along the two longitudinal edges. However, in this exemplary embodiment for the formation of the projections 16, the cut-outs are formed of undercut hollows 17 which can be produced in various ways. The abovedescribed reinforcements 2' and 3' are again arranged on these rounded projections 16 so that following the interlocking of the projections 16 in the closure area, a continuous bead is again formed. The cross-section of these reinforcements 2' and 3' can also be approximately T-shaped. It should thus be clear that the formation of the projections is independent of the formation of the reinforcements, which can likewise have different profiles.

Figure 5:
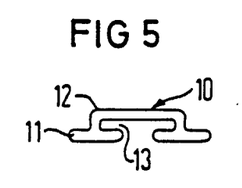
FIG. 5 illustrates a retaining element for the closure in accordance with the invention, and produced for example as an extruded synthetic component.

FIG. 5 represents a clip-like retaining element 10 which can be produced from different materials. This clip-like retaining element 10 fundamentally is formed of a U-shaped rail 12 where transverse, widened bearing edges 11 are arranged at the ends of the flanks. The inwardly extending parts of the bearing edges 11 would be sufficient for the engagement of the bead 15. However, in a further embodiment, the bearing edges 11 also extend outwardly, as shown in FIG. 5, so that the division between the longitudinal edges 7 can also thus be covered. This also permits a reliable covering of the longitudinal gap. The inner surfaces of the retaining element can also be coated, for example with a sealing agent, for example a fusion adhesive which can be activated by a supply of heat. A retaining element of this kind can be produced from metal or from heat-resistant synthetic material. However, in a special design of this retaining element, it is formed of an adaptable element. A suitable material for this purpose is, for example, a so-called memory metal or a synthetic material which is treated in such manner that it becomes shrinkable under the influence of heat. This means that a retaining element of such a design adapts itself in optimum fashion to the bead 15 of the sleeve and acts as a seal in the case of suitable inserts.

Figure 6:
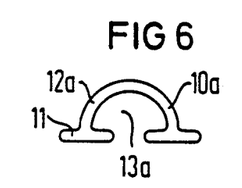
FIG. 6 illustrates the retaining element corresponding to FIG. 5 as a "stretched" molding which has a shape memory.

FIG. 6 represents an example of a heat-shrinkable retaining element 10a which has been "expanded" by an expansion process from the shape shown in FIG. 5. Fundamentally, the central zone 12a of the extruded synthetic rail 12 has been widened, its original form having been previously subjected to cross-linking. This serves to enlarge the clip area 13a into which the bead 15 can be introduced easily by pushing in or pressing on.

Figure 7:
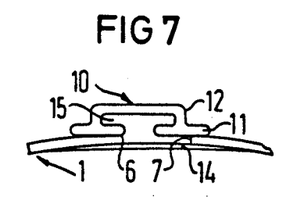
FIG. 7 is an end view of the closure area of the sleeve with an assembled retaining element corresponding to FIGS. 5 and 6.

FIG. 7 shows the final stage of the above-described closure process using a clip-like retaining element 10. As already described, the transverse bearing edges 11 engage into the longitudinal grooves 6 of the bead 15, and on the other hand cover the longitudinal slot at the end of the projection 7. This exemplary embodiment also shows that a lower step 14 can be additionally arranged in the inner region of the sleeve 1 and can cover and seal the longitudinal slot from the inside. This lower step 14 can also be formed of metal, for example an aluminum foil, so that the lower step can additionally serve as a heat conductor for the inner closure area in order to activate fusion adhesives or the like.

Figure 8:
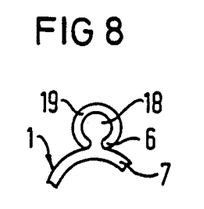
FIG. 8 represents, as a further exemplary embodiment, a retaining element which is applied to closure elements of approximately a circular formation.

Finally, FIG. 8 shows another exemplary embodiment of the invention in which the cross-section of the reinforcements 18 is approximately circular. Towards the projections 7 this again produces longitudinally extended types of grooves 6 which are undercut by the matching retaining element 19. Otherwise, the conditions are identical to those of the above-described exemplary embodiments.

Figure 9:
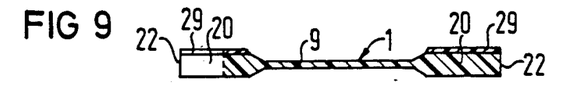
FIG. 9 illustrates in an end view an exemplary embodiment corresponding to the invention having smooth reinforcements of identical shape along the closure area.

FIG. 9 now represents an exemplary embodiment, in accordance with the invention, of a sleeve 1 in which the reinforcements 20 of the projections 22 represent a material reinforcement along the longitudinal edges. Due to the flat formation of the reinforcements 20 the retaining element can now even be formed of a longitudinally extending adhesive strip or a longitudinally extending strip to which adhesive has been applied. Also suitable for this purpose are, for example, known contact adhesives already applied in the form of adhesive coatings 29 and initially protected by a film. Alternatively, it is possible to use one-component or multi-component adhesive systems which, depending upon the storage requirements, can also be encapsulated. Following the removal of the protective film, the adhesive strip can be stuck over the projections 22, and assembled in series along the two longitudinal edges. In the case of repairs, it can become necessary for example to partially remove the strip. In this case, it can be mechanically torn off. A metallic fabric strip has the advantage of good heat conductivity, but has the disadvantage that it is difficult to remove. Synthetic carriers or glass carriers are advantageous for this purpose. Exemplary embodiments will be described later in the description.

Figure 10:
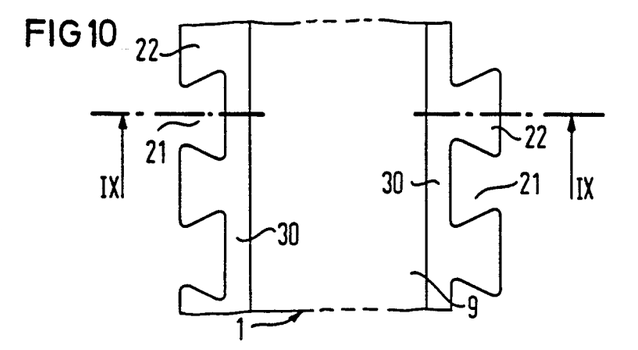
FIG. 10 shows a longitudinal dimension of the exemplary embodiment shown in FIG. 9.

In a plan view of FIG. 10 of the sleeve shown in FIG. 9, in this embodiment the reinforcements are wider than the depth of the cut-outs 21. This means that a narrow, longitudinal bead 30 additionally remains in the region of the cut-outs 21. This has the advantage that the area weakened by the cut-outs 21 is attached by this bead 30 to the shrinkable central zone 9, so that buckling or stretching also cannot take place in these zones due to the shrinkage forces. However, when the load is lower, the width of the reinforcements can be selected to be narrower than the depth of the cut-outs when the sleeves are correspondingly smaller and subject to a low load. A uniform closure is obtained when the width of the reinforcements corresponds to the depth of the cut-outs.

Figure 11:
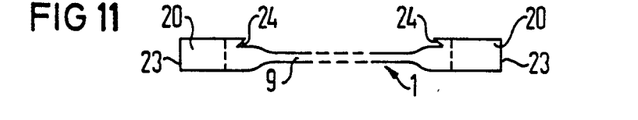
FIG. 11 shows an exemplary embodiment which fundamentally corresponds to that shown in FIG. 9, but with the reinforcements profiled.

FIG. 11 illustrates a further exemplary embodiment in which those flanks 24 of the reinforcements 20 which point towards the central component 9 of the sleeve 1 can be undercut in tapered fashion, so that following the assembly of the projections 23, two longitudinally extending, uninterrupted grooves are formed. Above this point it is again possible to apply a retaining element which secures the projections 23 at least during the assembly time.

Figure 12:
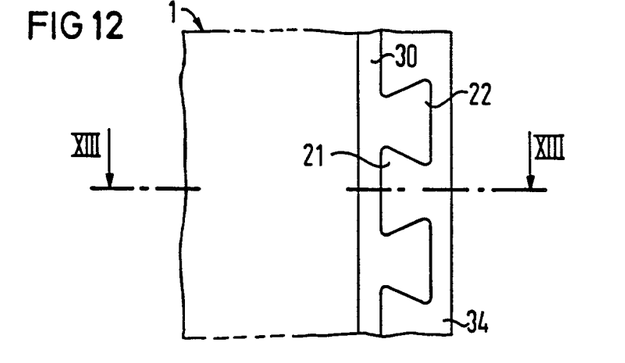
FIG. 12 shows a sleeve edge with an underlay of an adhesive or a compound film.

FIG. 12 represents an examplary embodiment in accordance with the invention in which the lower step 34 is formed, for example, of an adhesive which melts when heat is supplied, and which projects to such an extent that it covers the slots between the individual projections 22 situated in the closure area and melts when heat is applied in order to seal these slots.

Figure 13:
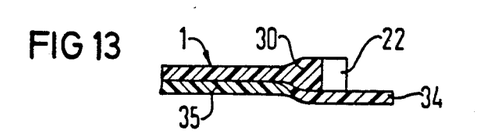
FIG. 13 illustrates a cross-section corresponding to FIG. 12 with the underlay in position.

FIG. 13 is a cross-section of the exemplary embodiment shown in FIG. 12. The lower step is attached along the one longitudinal edge, shown here, of the sleeve 1 by means of an adhesive 35 which covers the inner walls of the sleeve 1. This arrangement serves to prevent the individual projections 22 from slipping inwardly when they are fitted together. The two adhesives 35 and 34 preferably possess different melting points so that they can be optimally adapted to the requirements.

Figure 14:
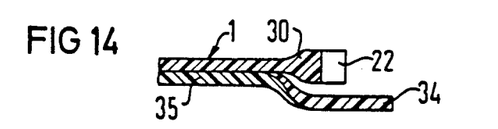
FIG. 14 illustrates a cross-section corresponding to FIG. 12 with a spring mounted lower step.

FIG. 14 illustrates an exemplary embodiment fundamentally corresponding to FIG. 13. Here, however, the lower step 34 is spring mounted in the closure area so that assembly is simplified by a deeper insertion of the projections. During the shrinkage process, compensation and alignment then automatically take place in one plane due to the radial shrinkage.

Figure 15:
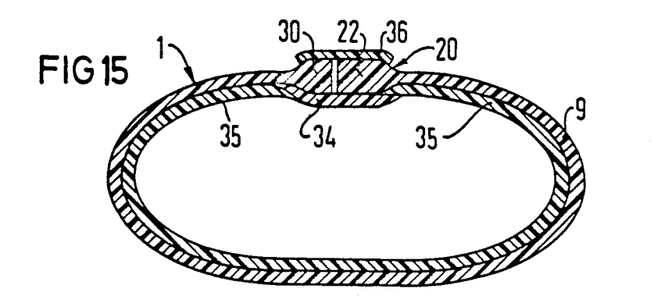
FIG. 15 illustrates a cross-section through an assembled sleeve, the closure area of which is fixed by a strip-like retaining element.

FIG. 15 illustrates the sleeve 1 in the assembled state where the closure area is fixed by a strip-like retaining element 36 which has adhesive properties. The sectional diagram corresponds to that point of FIG. 12 indicated by XIII—XIII. The central component 9 has very good shrinkage properties, and following the shrinkage process, encases the object in question, e.g. a cable or a cable splice, in sealing fashion.

Figure 16:
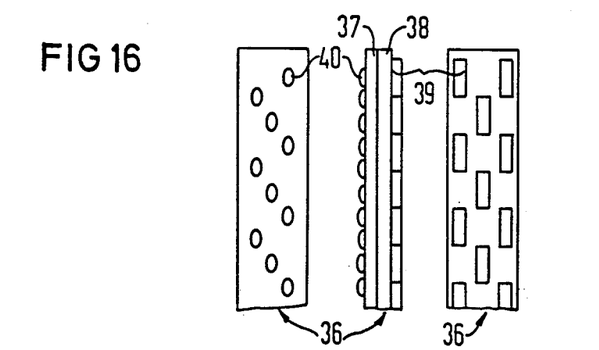
FIG. 16 represents a strip-like retaining element with a temperature indicator and various adhesives in three different views.

FIG. 16 represents three views of a retaining element 36 which can be used, for example, in the sleeve shown in FIG. 15. A simple adhesive strip which can be used in principle will not, however, always comply with all requirements. However, the illustrated example permits use even in difficult situations.

Naturally modifications are also possible in which an indication of sufficient heat supply, and at least periodic fixing by adhesive strips, or finally permanent sealing by fusable adhesives are necessary. A retaining element 36 of this kind consists, for example, of a synthetic or metal strip 37 possessing a smooth or grid-like foil structure. For an indication of the heat level, either a thermocolor dye 40 or a burnable synthetic material is applied to the exterior of the retaining element 36. Thus, it can be established that the heat supply was adequate by a reversal of color, or by a burning away of the material. Finally, on the inside there is arranged a layer 38 formed of heat-hardening adhesive which effects a seal by fusion when heat is supplied. Above this point, an adhesion adhesive 39 is at least partially applied. As a result, the inter-connected projections of the closure area can be fixed in the first assembly state.

Figure 17:
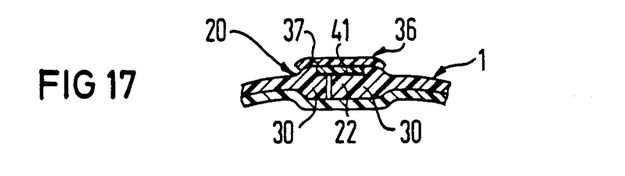
FIG. 17 illustrates a closure area with a longitudinal groove which serves to accommodate an adhesive layer of the retaining element.

FIG. 17 represents the closure area of the sleeve 1 in which fixing has been effected by a retaining element 36 as described above. Here a groove is provided in the region of the projections 22 and the longitudinally extending bead 30 for the adhesion adhesive 41 which is applied to the remainder of the strip component 37. The shape locking to the retaining element 36 can be improved by means of this groove and by means of lateral bevelling of the reinforcements.

Figure 18:
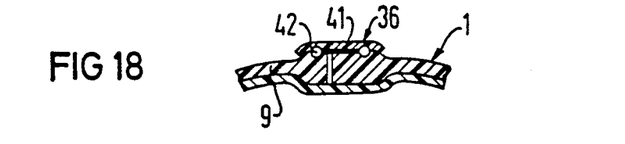
FIG. 18 represents a closure area with two adhesive inserts which have different effects.

FIG. 18 illustrates an exemplary embodiment with two longitudinally extending inserts 42 at both edges—directed towards the central component 9 of the sleeve 1—of the reinforcements in the region of the beads 30. These inserts 42 are formed of heat-hardenable adhesive, can be produced as extrusions, and can be applied for example as a co-extrusion in the production of the sleeve 1. However, the same is also possible in the case of the production of the retaining element 36 which here is coated in its central part with an adhesion adhesive 41 for fixing during assembly.

Figure 19:
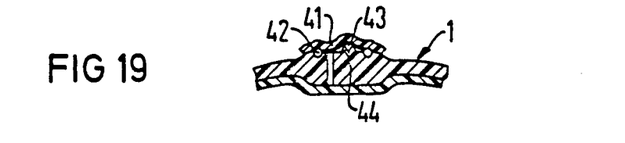
FIG. 19 illustrates the closure system shown in FIG. 18 with ventilating channels.

In an extended example, FIG. 19 illustrates the formation of channels 43 by corresponding ribs 44 which allow air to escape during the closure process. These ribs 44 are designed such that the channel 43 cannot be filled by the retaining element 36, thus allowing the air to escape forwards and backwards. Otherwise the conditions are identical to those of the examples which have already been described in detail.

Figure 20:
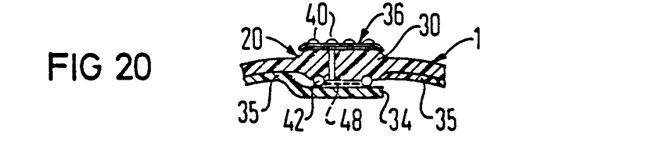
FIG. 20 illustrates the closure system with an inner retaining element.

FIG. 20 represents an exemplary embodiment in which the retaining element 36, with a layer of adhesion adhesive, is arranged on the outer surface of the longitudinally extending reinforcements 20, whereas the two longitudinally extending inserts 42 of heat-hardenable adhesive are arranged on the inner surface of the longitudinally extending reinforcements. Following the activation of the adhesives inside the closure area, the closure area is sealed from the inside and the distribution of the adhesives is assisted by shrinkage forces. If necessary, an additional adhesive layer 48 can be provided in the inner area so that the closure area can be fixed when the projections are fitted together. To the outer retaining element 36 there is also applied a thermocolor coating 40 which indicates, by a reversal of color, when the heat supply to the closure area can be terminated. In this case, for example, the retaining element 36 is provided only with one layer of adhesive so that it can be removed at the end of the shrinkage process.

Figure 21:
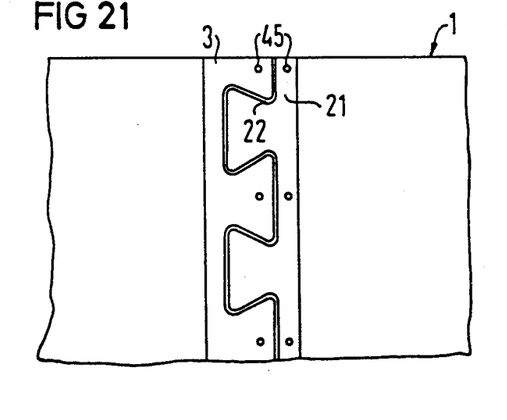
FIG. 21 illustrates a possibility of fixing the ends of the closure system.
Figure 22:
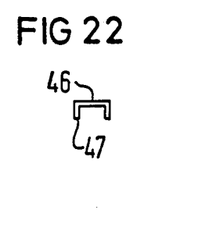
FIG. 22 illustrates the formation of a clip element for fixing in accordance with FIG. 21.

FIG. 21 shows that the ends of the sleeve 1 may need to be secured from pulling apart in the closure area. For this purpose, holes 45 are introduced into the reinforcements 30 in the region of the projections 22 opposite the cut-outs 21. Into these holes, depending upon the longitudinal portion of the sleeve 1, a clip 46 (FIG. 22) engages by its flanks 47. This serves to prevent the ends of the closure area, which have softened during the shrinkage process, from separating from each other, and even snapping open.

Figures 23, 24:
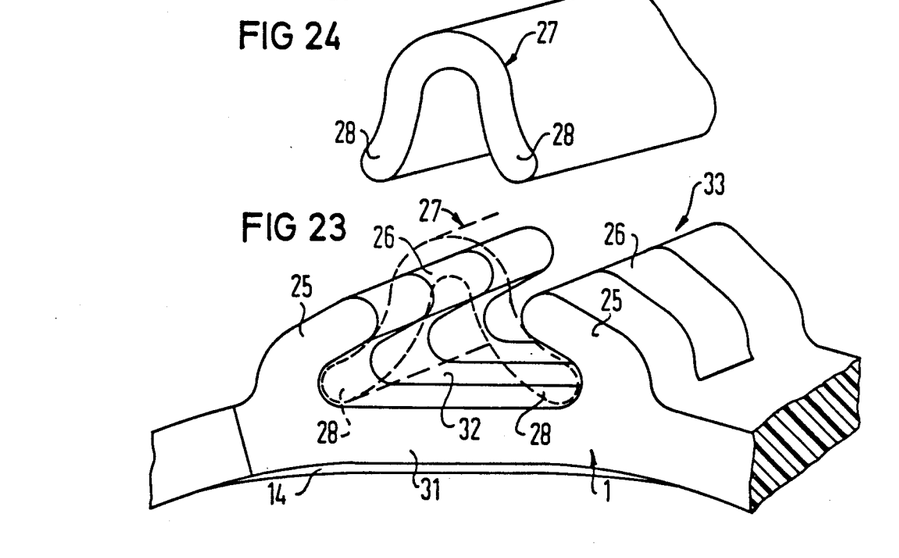
FIG. 23 illustrates a further exemplary embodiment in accordance with the invention in which two longitudinal reinforcements along the closure area form one, single, undercut groove into which a retaining element can be inserted.
FIG. 24 illustrates a retaining element of shrinkable material in an "extended" state, compared to the exemplary embodiment shown in FIG. 23.

FIG. 23 represents an exemplary embodiment of the invention in which the projections 31 and 32 of the two longitudinal edges of the sleeve 1 each bear two reinforcements 25 and 26, which extend in the longitudinal direction in parallel with one another. The projecting ends of these reinforcements 25 and 26 are inclined relative to one another s that undercut subsidiary grooves are formed which, following the fitting together of the projections 31 and 32 of the two longitudinal edges, join up to form one single continuous groove 33. A longitudinally directed retaining element 27 can be inserted into this groove 33 at least during assembly for the fixing of the interconnected projections 31 and 32. Here the projections 31 and 32 are shown to be rectangular, although dove-tail-like cut-outs are also possible in this example. Thus, here too, undercut, self-fixing projections are formed. By way of retaining elements 27, here an approximately U-shaped rail has been fitted into the groove 33 and the two flanks 28 are expanded into the undercut region of the groove 33. This insures a good alignment of the individual projections 31 and 32.

For assembly, it is particularly advantageous that the retaining element 27 should be first lightly inserted into the groove 33, and then firmly inserted during the subsequent shrinkage of the sleeve 1 and of the retaining element 27. This is possible, for example, using a retaining element 27 formed of a material having a shape memory, for example a memory-metal or a shrinkable synthetic material.

Figure 25:
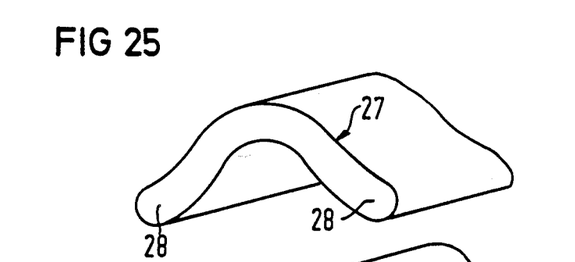
FIG. 25 illustrates the retaining element shown in FIG. 24 in the "shrunk" state.

Thus, by way of example, FIG. 24 illustrates a retaining element 27 formed of a shrinkable synthetic material, and in this view the retaining element 27 has already expanded, i.e. has reached a state which is unstable when heat is supplied. However, this form permits the retaining element 27 to be lightly inserted, by its two flanks 28, into the groove 33 in the assembled sleeve 1. When heat is supplied, which takes place when the sleeve 1 shrinks, the retaining element 27 attempts to regain its original form as shown in FIG. 25. As a result, the flanks 28 spread outwardly and are supported against the inclined reinforcements 25 and 26, as shown in FIG. 23. The retaining element 27 can possess transverse indentations in order to increase the flexibility.

Fundamentally, the retaining element can be designed in all the exemplary embodiments of the invention in such a manner that only during assembly, and in particular during the shrinkage process, it serves as a tool which can subsequently be removed following the fixing of the closure area, for example by means of appropriate adhesive means. The retaining element then serves merely as a removable fixing means for the closure area.

Although various minor changes and modifications might be proposed by those skilled in the art, it will be understood that we wish to include within the claims of the patent warranted hereon all such changes and modifications as reasonably come within our contribution to the art.

We claim as our invention:

1. A sleeve, comprising:
a shrinkable material sleeve body with a longitudinal closure comprising projections and corresponding cut-outs along longitudinal edges;
the projections and the cut-outs being offset relative to one another and being inserted into one another such that projections of one of the edges are received in the cut-outs of the other edge so as to form the sleeve body in a curved fashion;
the projections having longitudinally extending reinforements which extend outwardly from the sleeve body via a central rib formed by a longitudinal recess beneath the reinforcements on at least one side of the rib, the individual reinforcements being arranged in a series to form a single longitudinal reinforcement strip; and
a retaining means positioned and dimensioned for at least partially covering the single longitudinal reinforcement strip so as to maintain the individual reinforcements in line with one another.

2. A sleeve according to claim 1 wherein the projections are formed by cut-outs.

3. A sleeve according to claim 2 wherein the projections are formed by dove-tail cut-outs.

4. A sleeve according to claim 1 wherein the ribs have undercuts along opposite longitudinal sides so that a longitudinal recess is formed at both sides of the ribs.

5. A sleeve according to claim 4 wherein the projections are formed by rounded cut-outs.

6. A sleeve according to claim 1 wherein the retaining means comprises a strip with at least one longitudinal edge which wraps around the reinforcements into said at least one longitudinal recess.

7. A sleeve according to claim 6 wherein the retaining means comprises a U-shaped strip provided with a heat-resistant adhesive coating and is arranged along a closure region of the sleeve so as to cover and surround the projections.

8. A sleeve according to claim 7 wherein the adhesive coating comprises a partially applied adhesion adhesive.

9. A sleeve according to claim 1 wherein the reinforcements comprise outwardly directed, bead-like widened regions along the outer edges and having two longitudinally extending grooves on opposite sides of said central rib.

10. A sleeve according to claim 1 sherein the central rib and reinforcements form an approximately T-shaped profile.

11. A sleeve according to claim 1 wherein the reinforcements form an approximately circular profile.

12. A sleeve according to claim 1 wherein the retaining means comprises a U-shaped rail having inwardly directed portions at flanks thereof.

13. A sleeve according to claim 1 wherein the retaining means comprises a U-shaped rail, and wherein transversely directed, widened bearing edges are arranged at ends of flanks thereof.

14. A sleeve according to claim 1 wherein the retaining means comprises metal.

15. A sleeve according to claim 1 wherein the retaining means comprises a heat-resistant synthetic material.

16. A sleeve according to claim 15 wherein the synthetic material is cross-linked.

17. A sleeve according to claim 1 wherein the retaining means comprises a material which has a shape memory.

18. A sleeve according to claim 1 wherein the retaining means is designed and shaped for removal following a shrinkage.

19. A sleeve according to claim 1 wherein a width of the reinforcements is less than a depth of the cut-outs.

20. A sleeve according to claim 1 wherein a width of the reinforcements is substantially equal to a depth of the cut-outs.

21. A sleeve according to claim 1 wherein a width of the reinforcements is greater than a depth of the cut-outs so as to form a bead substantially extending along a closure region of the sleeve.

22. A sleeve according to claim 1 wherein the projections have a lower step which covers a longitudinal gap.

23. A sleeve according to claim 22 wherein the lower step comprises a fusion adhesive.

24. A sleeve according to claim 1 wherein the single longitudinal reinforcement strip is continuous without gaps.

25. A sleeve according to claim 1 wherein longitudinally extending inserts comprising heat-hardeneable adhesive are arranged in a closure region of the sleeve.

26. A sleeve according to claim 25 wherein the inserts are arranged on the retaining means.

27. A sleeve according to claim 26 wherein the inserts are arranged in grooves in a closure region of the sleeve.

28. A sleeve according to claim 1 wherein the retaining means is provided with a means for displaying that sufficient heat has been supplied.

29. A sleeve according to claim 1 wherein clips are arranged at ends of a closure area region of the sleeve.

30. A sleeve according to claim 1 wherein the projections each terminate at an outer edge of the reinforcements.

31. A sleeve, comprising:
a sleeve body having a central curved portion and facing outer opposite longitudinal edges;
at the longitudinal edges, projections and corresponding cut-outs at each side of the projections along both longitudinal edges;
the projections and cut-outs at one longitudinal edge being offset relative to the other longitudinal edge such that the projections of one longitudinal edge are mated in the cut-outs of the other longitudinal edge with the sleeve body being curved so as to form a closure area wherein the two longitudinal edges are adjacent one another;

the projections having longitudinally extending reinforcements which, with the projections inserted in the cut-outs, are arranged in line end-to-end, the reinforcements extending outwardly from the sleeve body via a central rib formed by longitudinal recesses beneath the reinforcements on both sides of the rib; and a retaining element positioned and dimensioned to fit over the line of reiniforcements at the closure region.

* * * * *